May 6, 1930.  G. H. KOCH  1,757,637
CIRCUIT CONTROLLING MECHANISM
Filed April 11, 1927  2 Sheets-Sheet 1
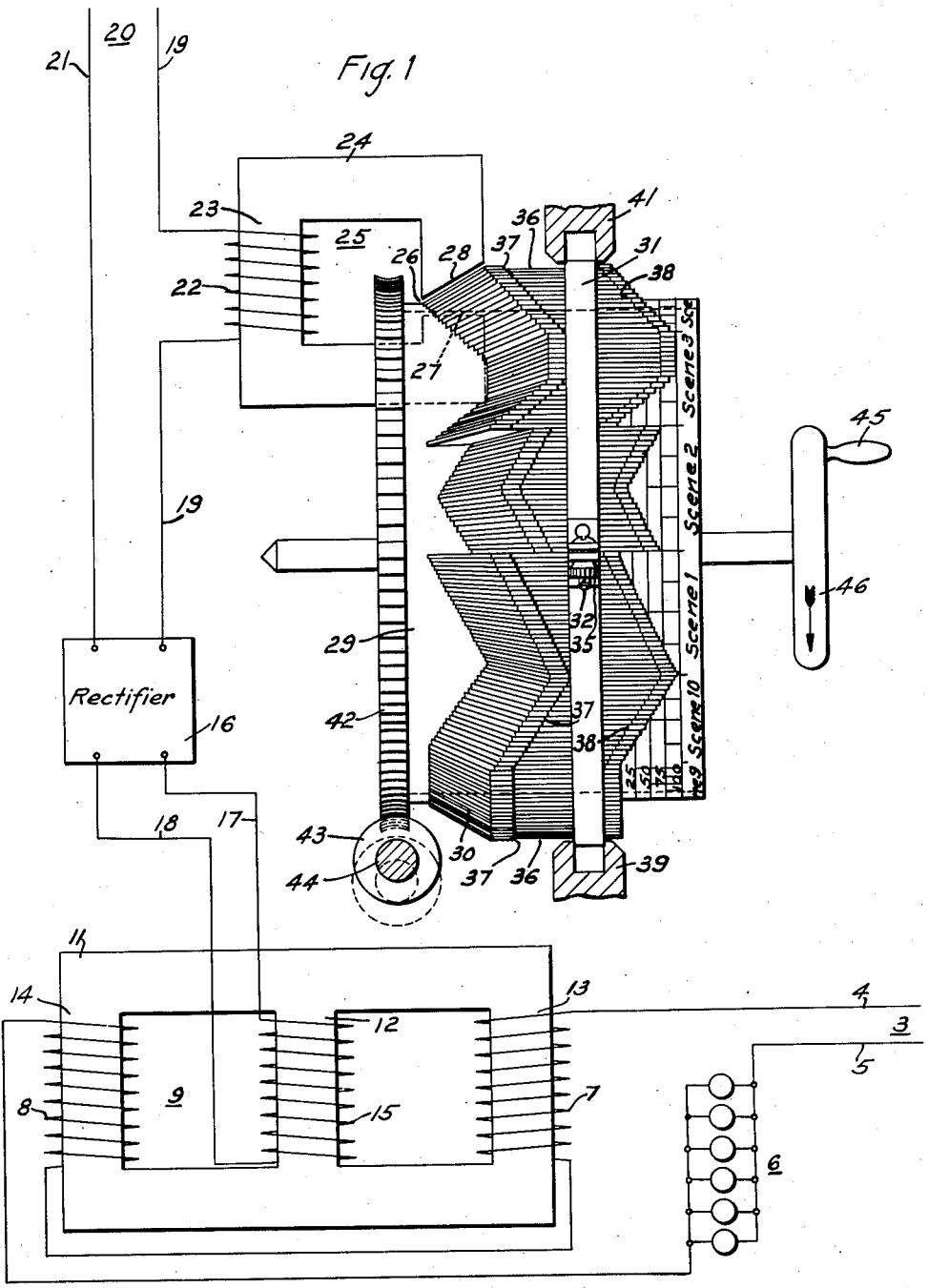

May 6, 1930.  G. H. KOCH  1,757,637
CIRCUIT CONTROLLING MECHANISM
Filed April 11, 1927  2 Sheets-Sheet 2

WITNESSES:

INVENTOR
Gustav H. Koch
BY
ATTORNEY

Patented May 6, 1930

1,757,637

UNITED STATES PATENT OFFICE

GUSTAV H. KOCH, OF WILKINSBURG, PENNSYLVANIA, ASSIGNOR TO WESTINGHOUSE ELECTRIC & MANUFACTURING COMPANY, A CORPORATION OF PENNSYLVANIA

CIRCUIT-CONTROLLING MECHANISM

Application filed April 11, 1927. Serial No. 182,614.

My invention relates to circuit-controlling mechanism and particularly to mechanism for controlling theater-lighting circuits.

One object of my invention is to provide a circuit-controlling unit for theater lighting purposes wherein the potential of the lighting circuit may be varied and wherein the apparatus may be preset to cause predetermined variations in the potential of the lighting circuit during a plurality of scenes of a theater performance.

In a copending application, Serial No. 131,303, filed August 24, 1926, by James C. Masek and assigned to the Westinghouse Electric & Manufacturing Company of East Pittsburgh, Pa., circuit-controlling apparatus is disclosed wherein the lighting circuit is controlled by a reactor that is controlled by a rheostat. Mechanical means are provided for predetermining the current potential for a plurality of scenes of a theatrical performance.

Another object of my invention is to provide a circuit-controlling unit using a reactor for varying the current potential and wherein a control reactor is used to control the main-circuit reactor instead of the mechanical resistance or rheostat disclosed in the said copending application.

Another object of my invention is to provide a circuit-controlling apparatus having the above noted characteristics wherein a control reactor having a magnetic core provided with an air gap serves to control the main circuit reactor and wherein the reluctance in the magnetic circuit is varied by increasing or decreasing the amount of magnetic material in the magnetic circuit or by varying the air gap in the magnetic circuit.

Another object of my invention is to provide a circuit-controlling apparatus having an adjustable armature that moves through the air gap of a magnetic circuit of a control reactor and wherein the armature laminæ may be adjusted to produce various potentials in the control circuits for the main circuit reactor.

Figure 3:
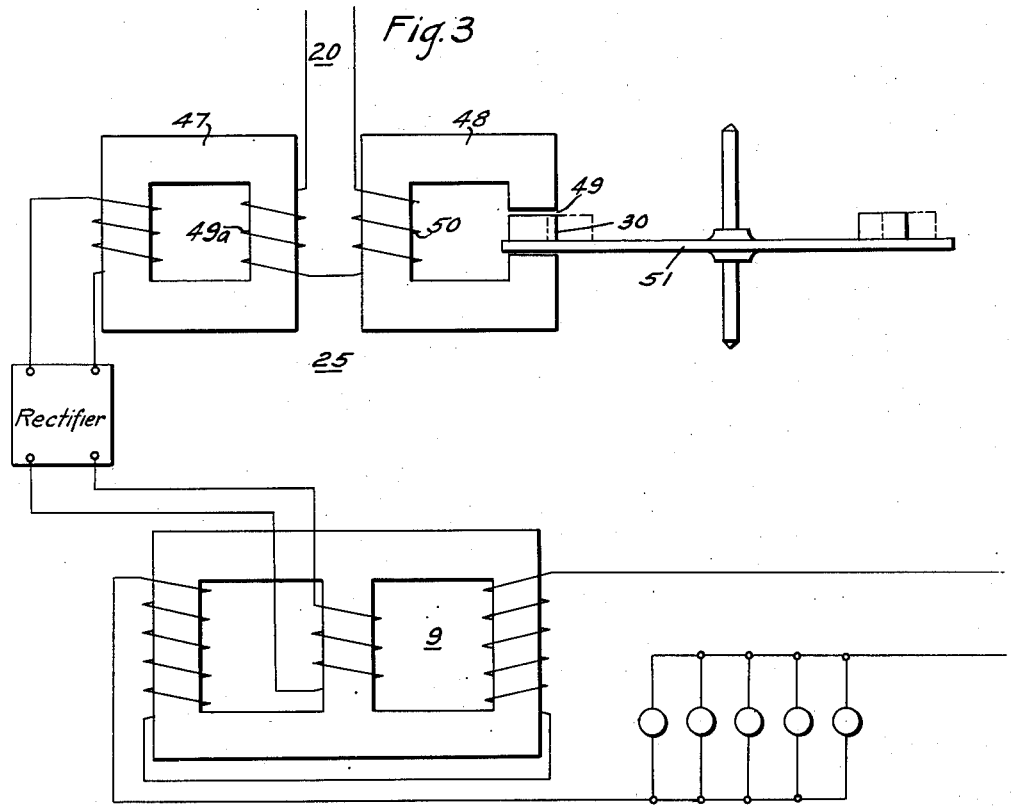
Figure 2:
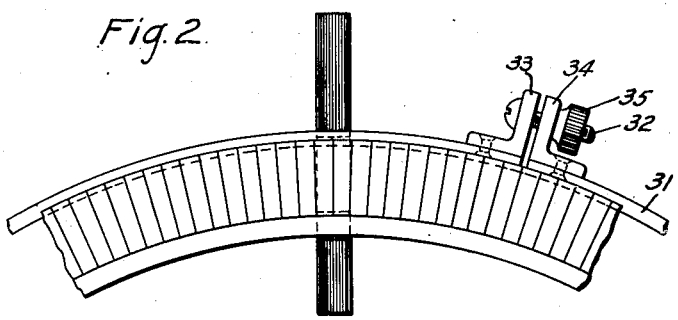

These and other objects that will be made apparent throughout the further description of my invention are attained by means of the circuit control apparatus hereinafter described, and illustrated in the accompanying drawings, wherein:

Figure 1 is a side elevation of a circuit-controlling unit embodying features of my invention, showing certain parts of the apparatus and wiring therefor diagrammatically, Fig. 2 is an enlarged end view of a fragment of the armature drum shown in Fig. 1, and, Fig. 3 is a diagrammatic view of a modified form of control apparatus.

Referring to the drawings, the circuit-control apparatus includes a main lighting circuit 3 comprising feed conductors 4 and 5 that are connected to a load, such as a plurality of electric lamps 6, and to the series-connected coils 7 and 8 of a current-controlling reactor 9. The reactor comprises a magnetic core 11, preferably composed of a plurality of sheet-iron laminæ of the usual type, the core having a central leg 12 and legs 13 and 14 that are respectively surrounded by the coils 7 and 8. The center leg 12 of the core is surrounded by a direct-current control winding 15 that is connected to a rectifier 16 by means of conductors 17 and 18.

The rectifier is connected to an alternating-current supply circuit 20 consisting of conductors 19 and 21. A control reactor coil 22 is connected to the conductor 19 and surrounds a leg 23 of a magnetic core 24 of a control reactor 25. The core 24 is provided with an air gap 26 disposed between the ends 27 and 28 of the core 24. The end surface of the portion 28 of the core is inclined with respect to the surface of the portion 27, for a purpose to be hereinafter described.

Variations of the width of the air gap or the amount of magnetic material in the magnetic circuit causes variations in the reluctance of the magnetic circuit and, consequently, variations of the impedance in the coil 22, and such variations in the impedance in the circuit 20 will cause variations in the potential of the rectified-direct-current flowing through the control winding 15 of the circuit-controlling reactor 9. Variations in the potential of the direct-current flowing through the coil 15 varies the impedance of the reactor core and, therefore, causes variations of the potential in the main supply circuit 3, including the electric lamps.

The control reactor 25 is so designed that, when the air gap of the magnetic circuit is greatest, the potential of the lighting circuit containing the lamp 6 is maximum and, when the air gap has been reduced to its minimum thickness, the impedance through the supply circuit reactor coils 7 and 8 is maximum and, in such condition, the potential of the lighting circuit is below that necessary to cause the lamps to be luminous.

In order to vary the air gap of the magnetic circuit in the control reactor 25, or to vary the reluctance of the magnetic circuit, I provide a rotary drum or cylinder 29 preferably made of non-magnetic material and having a relatively thin wall which extends across the air gap between the ends 27 and 28 of the magnetic core 24, as shown in Fig. 1. Surrounding and mounted upon the drum or cylinder 29, a plurality of sheet-iron laminæ 30 are disposed in side-by-side relation, the laminæ being relatively movable longitudinally of the cylinder and being retained in adjusted position by means of a split clamp ring 31.

A screw 32 extends through end clips 33 and 34 of the band 31, and the clamp ring may be tightened by means of the threaded thumb nut 35. Each of the armature laminæ 30 is provided at its outer edge with a notch 36, providing shoulders 37 and 38 which limit the longitudinal movement of the armature laminæ with respect to the cylinder 29.

The ends of the laminæ adjacent to the reactor core 24 are tapered at an angle corresponding to that of the end face of the portion 28 of the core and, consequently, they may be moved toward the core to a distance wherein the air gap between the ends 27 and 28 of the core is substantially reduced to the thickness of the wall of the cylinder 29. The clamping band 31 may rotate with the cylinder but is prevented from moving longitudinally thereof by the guide members 39 and 41 which constitute a part of the frame or support for the cylinder.

The outer end of the cylinder is calibrated, by longitudinal lines, into a plurality of sections of equal length, each section defining a plurality of laminæ of the armature that serve to control the thickness of the air gap at a predetermined time during a particular scene. As shown in Fig. 1, each section is provided with a legend "Scene 1", "Scene 2", "Scene 3", etc.

The outer portion of the cylinder is also calibrated by circumferentially parallel lines representing the degree of width of the air gap when the outer end of the laminæ register therewith, and the parallel calibrating lines are provided with the legends Zero, 25, 50, 75 and 100, the numerals representing the degree of illumination afforded by the electric lamps resulting from the disposition of laminæ with respect to the said lines.

Referring to Fig. 1, it will be seen that the laminæ are disposed in the space on the cylinder representing scene 1 in such manner that the illumination at the beginning of scene 1 will be 100% and will gradually diminish to zero throughout the period of scene 1, it being understood that the drum or cylinder 29 is rotated in the direction of the arrow during the period of the scene through the space on the cylinder assigned to scene 1.

At the beginning of scene 1, the air gap is of maximum width, and the reluctance of the magnetic circuit is greatest. The impedance of the coil 22 is at its minimum at this time and, consequently, maximum current flows through the control coil 15, thus reducing the impedance of the coils 7 and 8 to a minimum amount, with the result that the illumination is substantially 100%.

As the drum is rotated, the air gap is gradually reduced until, at the end of scene 1, the air gap is of minimum width and, consequently, the impedance of the coil 22 greatest. Minimum current then flows through the coil 15, and the impedance of the coils 7 and 8 is increased until the potential in the lighting circuit is insufficient to cause illumination.

As illustrated in Fig. 1, it will be seen that the armature laminæ for controlling scene 2 are so disposed as to cause an increase of illumination during 50% of the scene, the illumination starting at 75% and decreasing until it is 25%. During the latter half of scene 2, the illumination will be increased from 25% to 75%.

During scene 3, the illumination will start at zero and increase to 100% during the first half of the scene and will be maintained at 100% during the balance of the scene. During scene 4 the illumination will start at 100% and decrease to zero. Thus, it will be seen that, by varying the contour of the tapered ends of the armature laminæ, any desired variations in the illumination may be accomplished during a predetermined period of time.

The drum 29 is provided with a worm wheel 42 that meshes with a worm 43 carried by a movable shaft 44. It will be understood that a drum, such as the drum 29, is provided for each separate lighting circuit of the theater and that the drums may be simultaneously rotated by the worm shaft 44. However, should it be desirable to rotate the drums individually while the armature laminæ are being adjusted, the worm shaft 44 may be withdrawn to the position indicated in dotted lines, clear of the worm wheels on the drums, and the drums may then be rotated by an operating handle 45 on the hand wheel 46.

When it is desired to re-adjust the armature laminæ, the thumb nut 35 is loosened sufficiently to permit of longitudinal movement of the armature laminæ. After the adjustment has been made, the laminæ are fixed in position by tightening the thumb nut.

Referring to Fig. 3, a modified form of control mechanism is shown wherein the reactor 9 is substantially the same as that disclosed in Fig. 1, but wherein the control reactor 25 comprises a closed magnetic core 47 and a magnetic core 48 that is provided with an air gap 49. The cores 47 and 48 are coupled by two series-connected coils 49ª and 50 that are connected to the alternating-current control circuit 20. The amount of magnetic material in the magnetic core 48 is varied by means of laminæ 30 that are adjustably mounted on a rotary disc 51 in such manner that they may be moved radially into or out of the air gap. The effect produced is substantially the same as that produced by the apparatus disclosed in Fig. 1, it being understood that the laminæ 30 are relatively adjustable upon the disc and are divided into groups for controlling the lighting circuit of a plurality of scenes.

It will be seen from the foregoing that a simple electromagnetic pre-settable means is provided for controlling a theater-lighting circuit and that there are relatively few movable parts necessary to accomplish the results obtained.

Various modifications may be made in the device embodying my invention without departing from the spirit and scope thereof and I desire, therefore, that only such limitations shall be placed thereon as are imposed by the prior art or set forth in the appended claims.

I claim as my invention:

1. The combination with a reactor having a control winding, of a control reactor for the winding and means for varying the reluctance of the magnetic circuit of the control reactor for varying the potential of the control winding.

2. The combination with a reactor having a control winding, of a control reactor for the winding having a magnetic core provided with an air gap, and a movable armature cooperating with the core for varying the amount of magnetic material in the magnetic circuit for varying the potential of the control winding.

3. The combination with a reactor having a control winding, of a control reactor for the winding having a magnetic core provided with an air gap, and an adjustable armature movable in the air gap for varying the reluctance of the magnetic circuit and thereby causing variations of the potential of the control winding.

4. Control apparatus comprising a reactor having a direct-current control winding, a control circuit, a control reactor therefor, means for varying the reluctance of the magnetic circuit of the control reactor for controlling the potential of the control circuit, and a rectifier connected in the control circuit between the control reactor and the control winding.

5. Control apparatus comprising a reactor having a control winding, a control reactor therefor having an air gap in the magnetic circuit, and a rotary member provided with an adjustable magnetic armature movable through the air gap to vary the thickness thereof and to thereby vary the reluctance of the magnetic circuit of the control reactor.

6. A reactor having a magnetic core provided with an air gap and a movable laminated magnetic armature having relatively adjustable laminæ for varying the air gap as the armature is moved therethrough.

7. A reactor having a magnetic core provided with an air gap, a movable laminated magnetic armature therefor having relatively adjustable laminæ for varying the air gap as the armature is moved therethrough, and means for retaining the laminæ in adjusted positions.

8. A reactor comprising a magnetic core, a movable laminated magnetic armature cooperating therewith to establish a magnetic circuit and having relatively adjustable laminæ for varying the reluctance of the magnetic circuit as the armature is moved with respect to the core.

9. A reactor comprising a magnetic core, a movable annular armature cooperating therewith to establish a magnetic circuit and having an irregular contour for varying the reluctance of the magnetic circuit as the armature is moved with respect to the core.

10. The combination with a reactor having a control winding, of a control reactor for the winding having a magnetic core, a movable armature cooperating therewith to establish a magnetic circuit and for varying the reluctance of said magnetic circuit for varying the potential of the control winding.

In testimony whereof, I have hereunto subscribed my name this 8th day of April, 1927.

GUSTAV H. KOCH.